Figure 5:
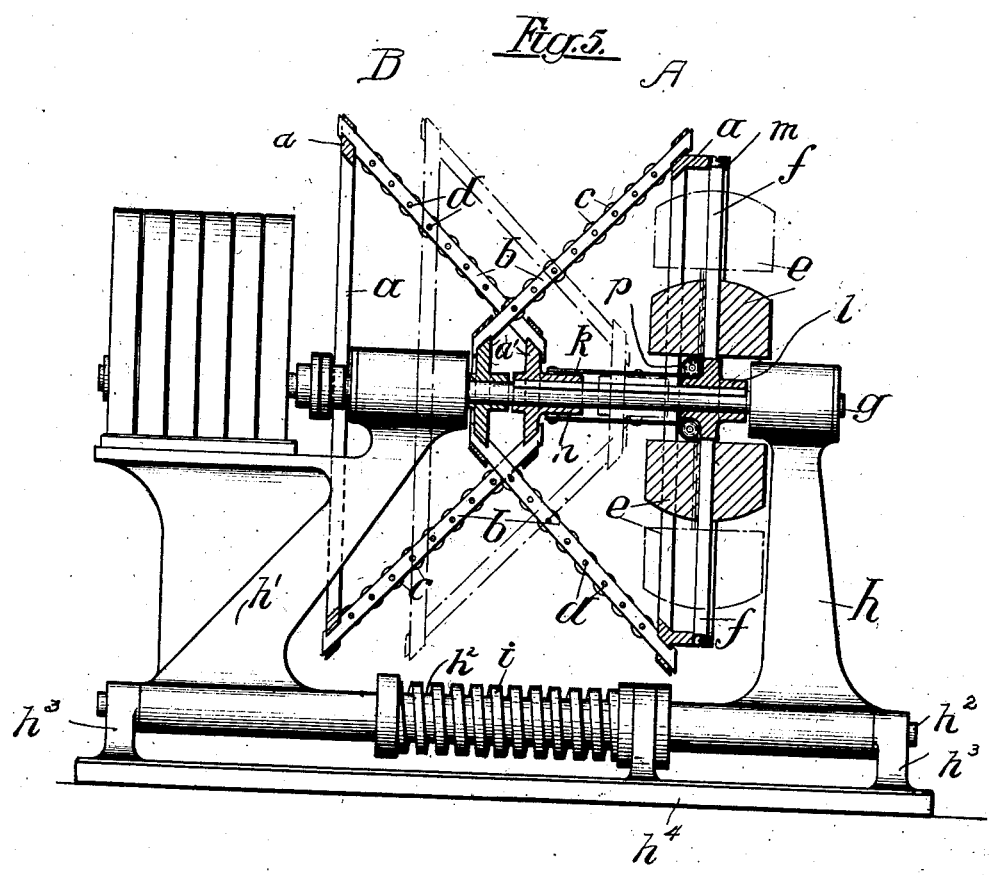

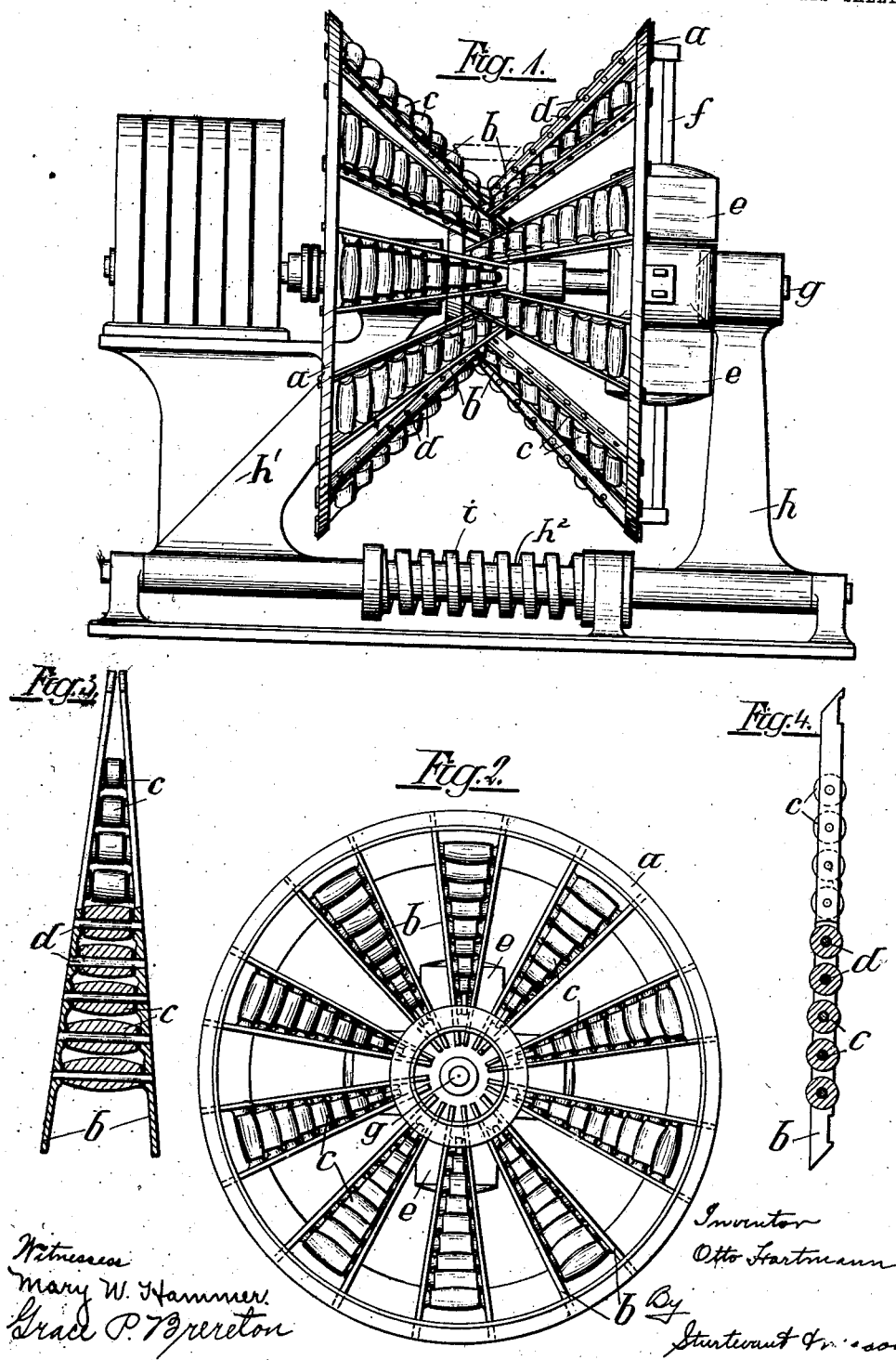

No. 895,855. PATENTED AUG. 11, 1908.
O. HARTMANN.
DRIVING PULLEY.
APPLICATION FILED SEPT. 16, 1907.

2 SHEETS—SHEET 2

Witnesses.
Albert Popkins
Mary W. Hammer

Inventor.
Otto Hartmann
By Sturtevant & Mason
Attorneys.

UNITED STATES PATENT OFFICE.

OTTO HARTMANN, OF STUTTGART, GERMANY.

DRIVING-PULLEY.

No. 895,855.  Specification of Letters Patent.  Patented Aug. 11, 1908.

Application filed September 16, 1907. Serial No. 393,038.

*To all whom it may concern:*

Be it known that I, OTTO HARTMANN, a citizen of the German Empire, residing at Stuttgart, in the Kingdom of Würtemberg, Empire of Germany, have invented certain new and useful Improvements in Driving-Pulleys; and I do hereby declare the following to be a full, clear, and exact description of the invention, such as will enable others skilled in the art to which it appertains to make and use the same.

This invention relates to pulleys and has for its principal object to provide a novel construction of sectional pulley, the active diameter of which may be readily adjusted.

A further object of the invention is to provide a pulley with a governing means for controlling the active diameter of said pulley.

A still further object of the invention is to provide a pulley formed of interfitting conical sections arranged to form a grooved belt surface of variable diameter, such surface being provided with anti-friction devices to permit ready change.

In the accompanying drawings,—Figure 1 is a side elevation of a pulley constructed in accordance with the invention; Fig. 2 is a face view of one of the conical members of the pulley; Fig. 3 is a detail view of one of the sections of which each member is composed, the view being partly in section; Fig. 4 is a side elevation of the same, partly in section; and Fig. 5 is a longitudinal sectional view of the pulley.

The pulley is mounted on a shaft $g$, having bearings carried at the upper ends of a pair of standards $h$, $h'$, these two standards being supported by a bolt or pin $h^2$ mounted in brackets $h^3$ on a base plate $h^4$.

The pulley is composed of two substantially frusto-conical members A, B, of similar construction. Each member includes a large ring $a$ and a small disk $a'$, and these members are provided with annular rows of openings for the reception of radially disposed inclined bars $b$, the end portions of which are notched where they fit within the annular openings, in order to form a rigid fastening. The bars $b$ are arranged in pairs and each pair carries an anti-friction member which will permit the belt or power transmitting member to readily accommodate itself to the varying diameter of the pulley. In the present instance, the bars of each pair are connected by a series of pins or small shafts $d$, on which are mounted anti-friction rollers $c$, the lengths of which gradually increase from the disk $a'$ outward.

The cone A is fixed to the shaft $g$, and the disk $a'$ of the cone B is feathered thereto, while the bars $b$ of the two members interlap, the disk $a'$ of each being located between the ring $a$ and disk $a'$ of the other, so that by moving the cone B on the shaft, the active diameter of the pulley may be increased or diminished.

In order to adjust the diameter automatically, provision is made for coupling the cone B to a governing device.

The ring $a$ of cone A has a central hub $l$, which is feathered to the shaft, and is provided with radial bars $f$, the outer ends of which are secured to lugs $m$, projecting from the ring $a$.

Mounted on the bars $f$ are slidable weights $e$, which move outward under the influence of centrifugal force, and these weights are connected by flexible members $k$ to the hub portion $n$ of disk $a'$ of the movable cone B, the flexible members being guided by small sheaves $p$ carried by the hub $l$.

It will be seen that as the speed increases, the weights $e$ will move outward and the cone B will be moved toward the cone A, so that the diameter at the point of intersection of the driving surfaces will be increased in proportion to increase in speed.

The standards $h$ and $h'$ are pivotally supported by the pin or bolt $h^2$, and the spring $i$ is secured at one end to a collar rigidly fastened to the pin or bolt $h^2$ and at its other end to a bracket loosely engaging said pin or bolt. Said spring normally tends to turn the brackets $h$ and $h'$, together with the pulley, so as to hold the belt under tension. As the diameter of the pulley is increased, a certain amount of the belt will be taken up by the increased diameter of the pulley and the brackets $h$ and $h'$ will then swing in a direction to supply the length of belt taken up by the pulley. This movement of the brackets $h$ and $h'$ is against the tension of the spring $i$, and as soon, therefore, as the pulley decreases in diameter, the spring will swing the brackets $h$ and $h'$, so as to still hold the belt under the same tension.

Having thus described my invention, what I claim as new and desire to secure by Letters Patent, is:—

1. A pulley composed of two conical interfitting sections and a governing means connecting said sections and serving automatically to relatively move the same in accordance with variations in speed, to thereby vary the active diameter of the pulley.

2. A pulley formed of interfitting conical members and a centrifugal governor connected to one of said members, and serving to move the same relatively to the other member.

3. A pulley formed of interfitting conical members one of which is arranged to slide toward and from the other, weights carried by the relatively stationary member, guiding means for said weights, and flexible connections between the weights and the movable member.

4. In a pulley, a shaft, a pair of interfitting conical members on the shaft, one of said members being fixed to the shaft, and the other being longitudinally movable thereon, radial guide bars, and guiding sheaves on the fixed member, weights disposed on the guide bars, and flexible members connecting the weights to the movable member.

5. In a pulley, a shaft, a pair of conical members, each including a disk and ring, the disk of each member being disposed between the ring and disk of the other member, and radially disposed inclined bars connecting the disk and ring of each member to form the driving surface of the pulley and a plurality of anti-friction devices carried by said bars.

6. In a pulley, a shaft, a pair of relatively movable conical members mounted thereon and each comprising a disk, a ring and connecting bars between the disk and ring, the disk of each member being between the disk and ring of the other member, and the bars crossing each other to form a grooved driving surface and a plurality of anti-friction devices carried by said bars.

7. In a pulley, a shaft, a pair of relatively movable conical members thereon, and a plurality of anti-friction devices carried by each of said members and arranged to move laterally of the pulley, when engaged by the belt or other transmission member.

8. In a pulley, a shaft, a pair of relatively movable conical members thereon, each member including spaced inclined bars forming the driving surface, and a plurality of anti-friction rollers supported by each of said bars, the axes of the rollers being transverse to the axis of the shaft.

In testimony whereof I affix my signature, in presence of two witnesses.

OTTO HARTMANN.

Witnesses:
  JEAN GULDEN,
  HERM. HOPPE.